(12) United States Patent
Gangstoe et al.

(10) Patent No.: US 7,595,608 B2
(45) Date of Patent: Sep. 29, 2009

(54) GATE DRIVER FOR A BATTERY PACK

(75) Inventors: Gunnar Gangstoe, Trondheim (NO);
Arne Aas, Trondheim (NO)

(73) Assignee: ATMEL Corporation, San Jose, CA (US)

( * ) Notice: Subject to any disclaimer, the term of this patent is extended or adjusted under 35 U.S.C. 154(b) by 336 days.

(21) Appl. No.: 11/373,821

(22) Filed: Mar. 10, 2006

(65) Prior Publication Data
US 2007/0210755 A1   Sep. 13, 2007

(51) Int. Cl.
H02J 7/00    (2006.01)
G05F 1/10    (2006.01)

(52) U.S. Cl. .................. 320/128; 320/134; 327/536

(58) Field of Classification Search ............... 320/127, 320/128, 134, 136; 327/536, 538; 323/222
See application file for complete search history.

(56) References Cited

U.S. PATENT DOCUMENTS

| | | | |
|---|---|---|---|
| 5,055,763 A | 10/1991 | Johnson et al. | |
| 5,355,028 A * | 10/1994 | O'Toole | 326/83 |
| 5,557,188 A | 9/1996 | Piercey | |
| 5,581,170 A * | 12/1996 | Mammano et al. | 320/116 |
| 5,640,078 A * | 6/1997 | Kou et al. | 320/124 |
| 6,160,381 A * | 12/2000 | Peterzell | 320/134 |
| 6,163,131 A | 12/2000 | Gartstein et al. | |
| 6,174,617 B1 * | 1/2001 | Hiratsuka et al. | 429/90 |
| 6,184,660 B1 | 2/2001 | Hatular | |
| 6,246,184 B1 | 6/2001 | Salerno | |
| 6,291,973 B1 * | 9/2001 | Lee | 320/128 |
| 6,646,422 B2 * | 11/2003 | Hogari et al. | 320/134 |
| 6,930,536 B2 | 8/2005 | Nazarian et al. | |
| 6,969,970 B2 | 11/2005 | Dias et al. | |
| 2003/0193364 A1 * | 10/2003 | Liu et al. | 327/536 |
| 2005/0017688 A1 * | 1/2005 | Stellberger | 320/134 |
| 2005/0275379 A1 * | 12/2005 | Tsukamoto et al. | 320/134 |
| 2007/0019450 A1 * | 1/2007 | Tiew et al. | 363/98 |

OTHER PUBLICATIONS

Dallas Semiconductor, "Battery Management. Mixed-Signal Design Solutions".
Linear Technology LTC4011, "High Efficiency Standalone Nickel Battery Charger".
PCT International Search Report corresponding to PCT/US07/63617 dated Feb. 27, 2008, 2 pages.

* cited by examiner

Primary Examiner—Akm E Ullah
Assistant Examiner—M'Baye Diao
(74) Attorney, Agent, or Firm—Fish & Richardson P.C.

(57) ABSTRACT

Apparatus, method and computer program product are provided for battery management. In one implementation, a method is provided. The method includes enabling determining if a charger is coupled to a battery system. The battery system includes one more cells and a charge enable transistor. The method also includes substantially fully enabling the charge enable transistor including driving a charge enable transistor gate terminal at a potential that is substantially greater than a potential of the cells.

15 Claims, 5 Drawing Sheets

GATE DRIVER FOR A BATTERY PACK

TECHNICAL FIELD

This invention relates to electrical circuits.

BACKGROUND

Many modern portable devices (e.g., laptop computers, mobile phones, digital cameras, video cameras, media players, personal digital assistants (PDAs), game console, etc.) include battery packs. One particular type of conventional battery pack includes one or more battery cells coupled to one or more Integrated Circuit (IC) chips. The chips typically include a controller (e.g., a microcontroller) and circuitry and provide, among other things, battery cell management and protection.

Some conventional battery packs include a Li-ion (Lithium ion) battery cell, which is essentially a volatile chemical reaction packaged inside a cylinder. Potential energy is stored in each cell, and if the battery cell is exposed to conditions outside of its specification the cell can over heat, catch fire or explode. Conventional battery packs configured with these volatile cells typically include fail-safe circuitry for detecting unsafe conditions (e.g., charge or discharge over-currents, short circuits, etc.), and for taking corrective action to prevent damage to the battery cell and/or device, and to protect the end user.

In some conventional battery packs, two external transistors (e.g., field effect transistor (FETs)) are connected in series with the battery cell(s) and are enabled and disabled to allow for the charge and discharge of the cells. The transistors allow the cell(s) to be disconnected from either the charger or a device based on one or more monitored conditions to avoid improper or dangerous operation. The disabling of the FETs can be triggered by certain events, such as short-circuit, too deep of a discharge, or incorrect battery charging as a result of the detection of too high of currents for too long a time period, to high or too low battery cell voltages or too high temperatures. The enabling of the FETs is also triggered by certain other events, when it is considered that potentially dangerous conditions are not present or have been resolved.

In one configuration, referred to as a high-side solution, the two transistors are coupled in series between the positive terminal of the cell(s) and a positive battery pack terminal (e.g., the external positive terminal interface to a device). In a low-side solution, the two transistors are coupled in series between the negative terminal of the cell(s) and a negative battery-pack terminal (e.g., the external negative terminal interface to a device).

SUMMARY

In one implementation, an apparatus, method and computer program product are provided for battery management. In general, in one aspect, a method is provided. The method includes enabling determining if a charger is coupled to a battery system. The battery system includes one more cells and a charge enable transistor. The method also includes substantially fully enabling the charge enable transistor including driving a charge enable transistor gate terminal at a potential that is substantially greater than a potential of the cells.

Aspects of the method can include one or more of the following features. Driving can include boosting a drive signal provided at a level of the cell potential. Drive can further include pumping up the drive signal to a boosted signal level to drive the charge enable transistor gate terminal. Pumping up the drive signal can include capacitively coupling a boost signal to the drive signal at the potential of the cells.

Boosting the drive signal can include boosting the drive signal to a level that is substantially equal to the potential of the cells plus a constant. The constant can be substantially equal to, or greater than, two times a regulated voltage, the regulated voltage being sourced by the cells. The constant can be substantially equal to, or greater than, two times the regulated voltage less voltage drops associated with blocking diodes. Driving can include boosting a drive signal with a booster circuit, the method further integrating the booster circuit and the charge transistor in an integrated circuit. Integrating the booster circuit and the charge transistor can include integrating using a high-voltage CMOS process. Integrating can further include integrating a microcontroller and memory in the integrated circuit to assist in cell charging functions.

Driving can include boosting a drive signal with a booster circuit, the method further integrating the booster circuit and the charge transistor in an integrated circuit. The integrating can include integrating using a high-voltage CMOS process; Driving can include boosting a drive signal with a booster circuit, the method further integrating the booster circuit, a microcontroller, memory and the charge transistor in an integrated circuit. The integrating can include integrating using a high-voltage CMOS process.

In general, in one aspect, a method is provided. The method includes enabling determining if a device is coupled to a battery system, the battery system including one more cells and a discharge enable transistor. The method also includes substantially fully enabling the discharge enable transistor including driving the discharge enable transistor to a potential that is greater than a potential of the cells to allow for normal discharging by the device.

In general, in one aspect, a method for charging and discharging a battery system is provided. The method includes enabling determining if an enable trigger for charging one or more cells of a battery system is present. If the enable trigger for charging is present, the method includes substantially fully enabling a charge transistor associated with the battery system to a fully enabled state including driving the charge transistor to a potential that is greater than a potential of the cells. The method includes enabling determining if an enable trigger for discharging the cells of the battery system is present. If the enable trigger for discharging is present, the method includes substantially fully enabling a discharge transistor associated with the battery system to a fully enabled state including driving the discharge transistor to a potential that is greater than a potential of the cells.

In general, in another aspect, an apparatus is provided. The apparatus includes a charge transistor operable to enable charging of one or more cells of a battery pack and a drive circuit operable to drive the charge transistor. The drive circuit includes a drive signal source providing a drive signal and a signal booster for driving the drive signal to a boosted level that is greater than a potential of the cells of the battery pack.

In general, in one aspect, an apparatus is provided. The apparatus includes a high-side NFET charge or discharge transistor and a drive circuit for driving the high side NFET charge or discharge transistor. The drive circuit includes a drive signal source providing a drive signal and a signal booster for driving the drive signal to a boosted level that is greater than a potential of the cells of the battery pack.

In general, in one aspect, an apparatus is provided. The apparatus includes a drive signal source for driving a charge or discharge transistor of a battery pack, and a signal booster for driving a drive signal to a boosted level that is greater than a potential of cells associated with the battery pack.

Aspects of the invention can include one or more of the following features. A battery management system is proposed that allows the complete enabling and disabling of charge and discharge transistors irrespective of the state of the battery cells or any coupled attending charger or device. A gate boost signal is provided that is above the level of the input voltage to the battery management system, and hence also above the battery cell potential, so as to be able to guarantee complete disablement or enablement functions when required. In one implementation, a proposed battery management system allows for complete enabling and disabling of high-side NFET transistors, such being more cost effective and able to be produced in a cost effective high-voltage CMOS process. Further, NFETs have smaller on-resistance than similarly sized PFETs. Accordingly, the proposed system including high-side NFET transistors can be implemented with cheaper and or fewer transistors.

A proposed solution includes integrated high-voltage output drivers in a battery management system. In one solution, NFET drivers are provided that are capable of driving the gate of external n-channel FET transistors to a sufficiently high level to achieve a proper on-state, and to a sufficiently low level to achieve a proper off-state. In one solution, the NFET's off-state is realized with an output voltage that is substantially equal to the ground level of the battery management system, and the on-state is realized with an output voltage that is significantly higher than a supply voltage to the battery management system.

The proposed solutions can be implemented as part of a one-chip battery management solution where the gate drivers, microcontroller, and non-volatile memory are integrated in one integrated chip ("IC" or chip). The chip can be implemented in a cost-efficient high-voltage CMOS process.

In a proposed high-side NFET solution, an output level of a driver to the charge and discharge transistors can be swung between substantially ground for the battery management system and a potential level that is substantially equal to the battery management system supply voltage plus a constant. The additional boost to the gate drive signal provides a more stable and flexible driving condition for the NFETs because the gate-source voltage of the NFETs will be stable and automatically adjusted to correct levels for different supply voltages (i.e., different battery cell and charger conditions). The automatic adjustment of the gate-source levels provides accurate and complete control of the NFETs over all operational bands.

The proposed high-side solution as well is advantageous over conventional low-side solutions. Conventional drivers for low-side FET solutions are not easily implemented in CMOS because output voltages significantly lower than ground are required in order to disable the FETs. Conventional battery packs with low-side FETs require Bipolar or BiCMOS technologies. Compared to a fully integrated CMOS solution, a bipolar solution does not enable a cost efficient integration of a microcontroller unit and non-volatile memory. BiCMOS technology is significantly more expensive to execute.

A proposed battery management system that includes a communication port can be readily implemented in a high-side solution without difficulties presented by low-side solutions associated with the communication signal levels and the ground of the battery management system. However, if a low-side solution is still desirable, teachings described herein relating to boosting the gate drive signals of the charge and discharge transistors may still provide advantages as disclosed. Further, though NFET solutions are described, boost drive signals can be used in PFET solutions as well.

The details of one or more embodiments of the invention are set forth in the accompanying drawings and the description below. Other features, objects, and advantages of the invention will be apparent from the description and drawings, and from the claims.

DETAILED DESCRIPTION

Reference will be made to a one-chip battery management system where a gate driver, a microcontroller, non-volatile memory, and other circuit components are integrated in single integrated circuit. Alternatively, the proposed methods and systems can be realized in a multi-chip solution. The methods and systems disclosed can be implemented in these and other architectures as would be understood by those of ordinary skill in the art. A method, apparatus and system are described for enabling and disabling charge and discharge transistors in the battery pack in a manner which ensures the complete enabling or disabling of the components in response to battery management system monitor circuitry.

Battery Pack Including Battery Management System

Figure 1A:
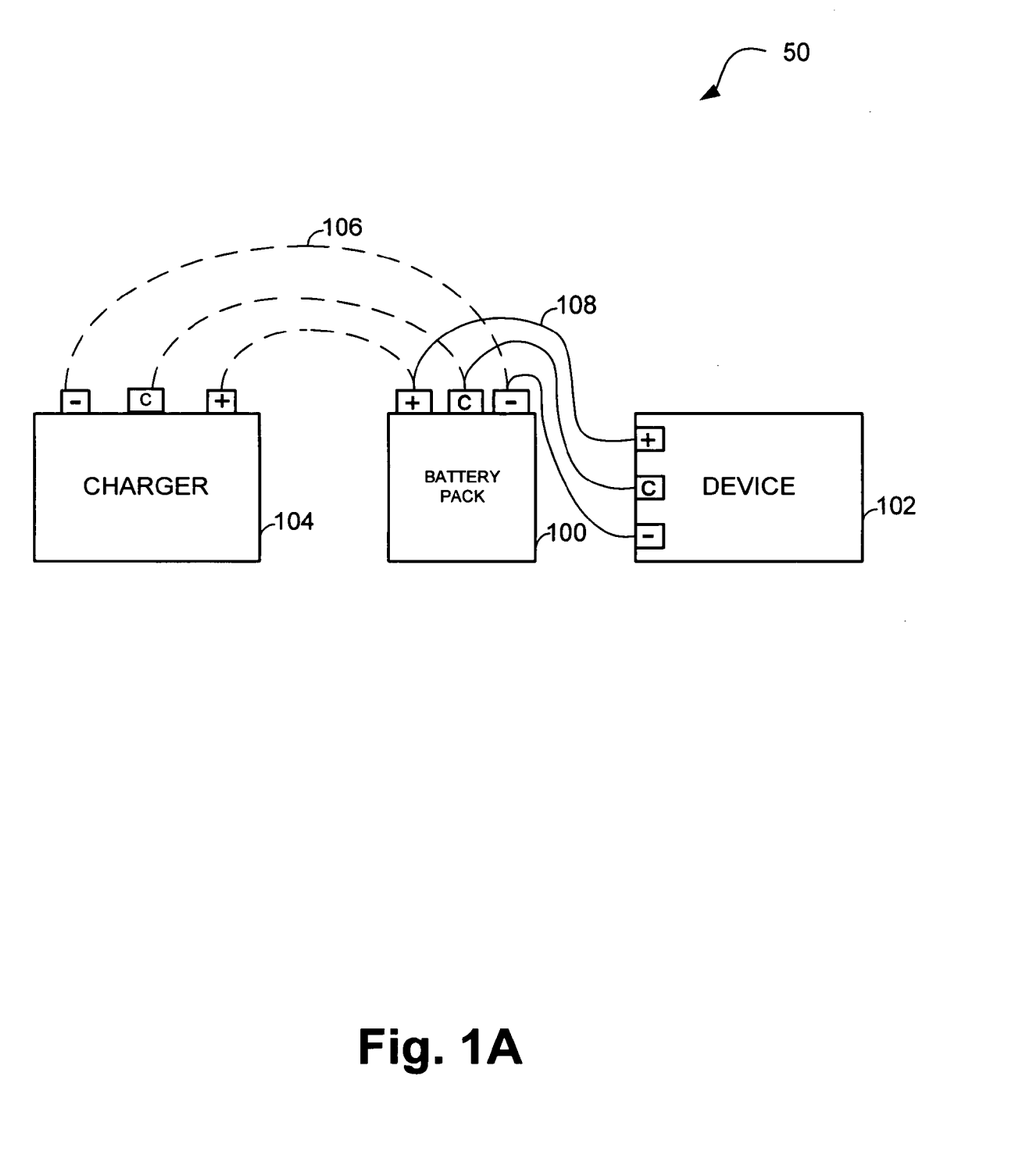
FIG. 1A is a schematic diagram of an application including a battery pack.

Referring now to FIG. 1A, a battery pack 100 for use in an application 50 is shown. Battery pack 100 can be coupled to either a device 102 or a charger 104. When coupled to the charger 104, terminals (i.e., positive, negative, and optionally communication terminals) of the battery pack 100 are coupled by a medium 106 to corresponding terminals (i.e., positive, negative, and communication terminals) of the charger 104 to allow for the charging of cell(s) associated with the battery pack 100. Medium 106 can be of the form of wires, leads, pins, or other means of electrical connection. Charging is discussed in greater detail below.

Similarly, when coupled to a device 102, terminals (i.e., positive, negative, and communication terminals) of the battery pack 100 are coupled by a medium 108 to corresponding terminals (i.e., positive and negative) of the device 102 to allow for the operation of the device 102. Medium 108 can be of the form of wires, leads, pins, or other means of electrical connection. In some implementations, battery pack 100 is also coupled to device 102 or charger 104 at respective communication ports. Communication ports allow for the transfer of information (e.g., command and control) between the device 102/charger 104 and battery pack 100. One example of information that can be exchanged includes the battery charge level (i.e., capacity).

Figure 1B:
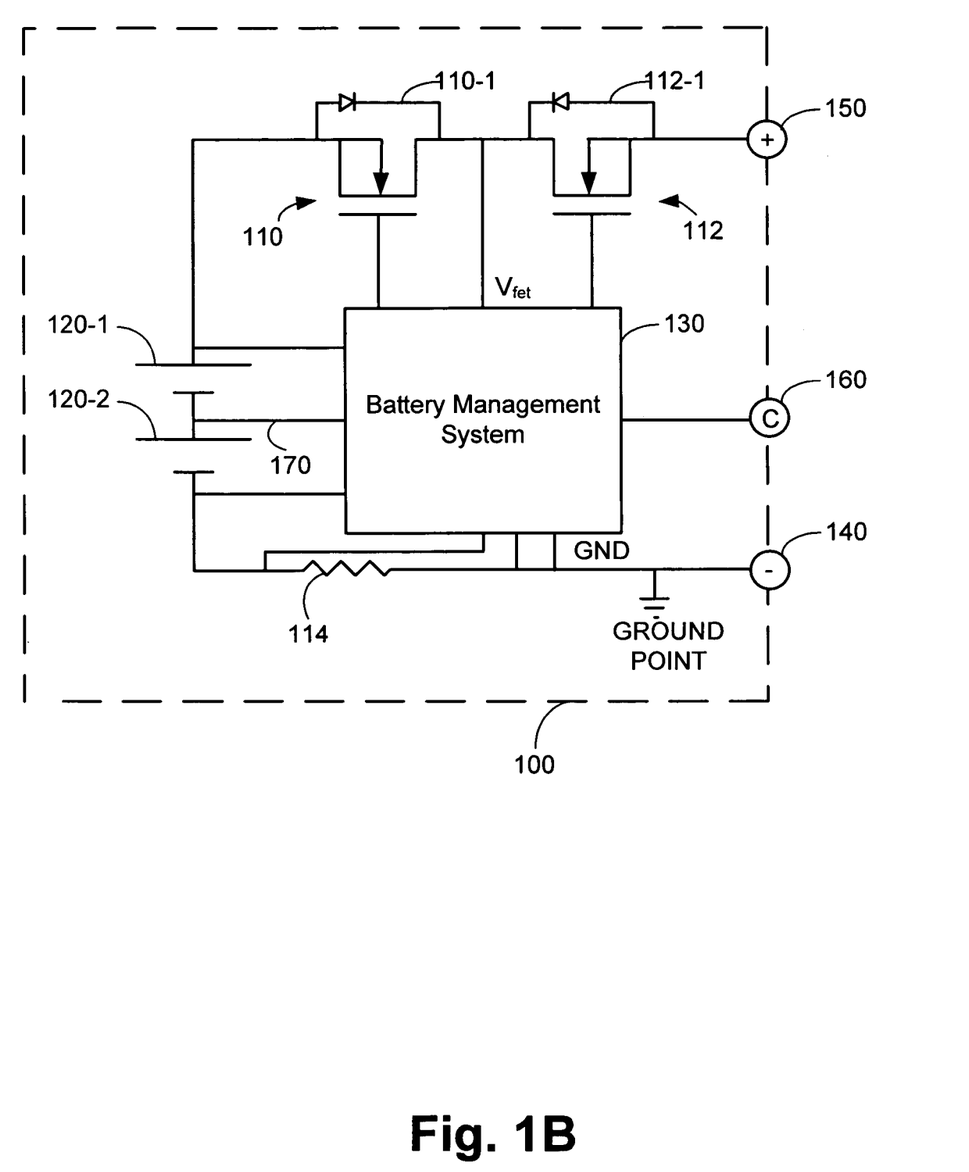
FIG. 1B is a schematic diagram of a battery pack.

Referring now to FIG. 1B, a more detailed schematic diagram is provided for battery pack 100. Battery pack 100 includes one or more battery cells 120, discrete transistors 110, 112, a shunt resistor 114, and battery management system 130. Battery management system 130 includes plural components, as discussed below, which can be integrated in a single package (e.g., integrated in a single integrated circuit). Alternatively, battery management system 130 components can be packaged separately. Discrete transistors 110, 112 can be separate from battery management system 130 and included in a separate package (e.g., a two-chip, or three-chip solution) or can be packaged together with the battery management system 130 components.

Discrete transistors 110, 112 are used to disconnect the battery cells 120 from the external battery pack terminals (external battery pack positive terminal 150 and negative terminal 140). In the implementation shown, two discrete transistors are shown which can be of the form of Field Effect Transistors (FETs). While other transistor technologies can be used, FETs present advantages in terms of process, performance (e.g., on-resistance), cost, size etc. In the implementation shown, two transistors are provided and represent separate charge 110 and discharge 112 transistors. Charge transistor 110 is used to enable safe charging of the battery cells 120. Discharge transistor 112 is used to enable safe discharging of the battery cells 120. The charge and discharge transistors 110,112 are coupled in series. In one implementation, two NFET transistors are used and are coupled drain-drain in a series configuration. Alternatively, two PFET transistors could be used and be coupled source-source. In a PFET solution additional diodes not shown may be required to provide power to the battery management system 130 (i.e., to feed $V_{fet}$).

In the implementation shown, the charge and discharge transistors 110, 112 are coupled in a high-side configuration (i.e., the series transistors are coupled to the high side of the battery cells as opposed to a low-side configuration). In the high-side configuration shown, one terminal of the charge transistor 110 (a source in a NFET implementation) is coupled to the positive terminal of the battery cell 120-1. One terminal of discharge transistor 112 (also a source in a NFET implementation) is coupled to the external battery pack positive terminal 150. Respective second terminals of the charge and discharge transistors 110, 112 are coupled to each other (forming a drain-drain junction in a NFET implementation). Gates of charge transistor 110 and discharge transistor 112 are coupled to battery management system 130 at inputs OC and OD, respectively. Similarly, the junction between the transistors 110, 112 is coupled to the battery management system 130 at a battery management system input (or sometimes referred to herein and labeled in FIG. 1b as $V_{fet}$). The battery management system input provides operational power to the battery management system 130.

In the implementation shown, two transistors are required to be able to block the current flow in both directions. More specifically, FETs include a parasitic diode (labeled 110-1 and 112-1, respectively) and accordingly having a single FET would not allow for the disabling of current flow in both directions. When two FETs are used in series (either source to source, or drain to drain), current flow into and out of the battery cells can be disabled. Similarly, when two transistors are used, selective control can be exercised to allow current flow in only a single direction at a given time (i.e., charge is allowed, but discharge is not until sufficient charge has been placed into the battery cells).

Battery cells 120 are rechargeable batteries and can be of the form of lithium ion (Li-ion) or lithium polymer (Li-polymer). Other battery technology types are possible. Where plural cells are provided, the battery cells 120 are coupled in series. In the two-cell implementation shown, a top-most positive terminal of battery cell 120-1 is coupled to the battery management system 130 (e.g., to allow for the detection of the battery voltage level) and to one of the discrete transistors (i.e., the charge transistor 110). The negative terminal of the top most battery cell 120-1 and the positive terminal of the bottom most battery cell 120-2 are coupled together and to the battery management system 120 at input 170. The negative terminal of the bottom most battery cell 120-2 in the series is coupled to the battery management system 130 (e.g., to allow for the detection of the battery voltage level) and to one terminal of the shunt resistor 114. Though a two battery cell implementation is shown, other number of battery cells can be included in battery pack 100, including a single battery cell and other multiple cell configurations. The second terminal of the shunt resistor is coupled to local ground (battery pack local ground), the battery management system 130 (to allow for the measurement of current flow through the shunt resistor 114) and to the external battery pack negative terminal 140 of the battery pack 100.

Battery management system 130 includes supervisor electronics to protect the battery pack in case of incorrect operation, monitoring electronics to estimate remaining battery capacity, a controller (e.g., a micro-controller) for system control and communication with the device and/or the charger coupled to the battery pack and memory (e.g., EEPROM, Flash ROM, EPROM, RAM, etc.). As discussed above certain battery technologies can create dangerous conditions if improperly used. For example, Li-ion and Li-polymer batteries can overheat, explode or self-ignite if they are overcharged or discharged too rapidly. Further, Li-ion and Li-polymer batteries can lose a significant amount of their charge capacity if they are too deeply discharged. Battery management system 130 includes supervisory electronics to ensure fault free operation, at least one of which is complete enabling and disabling of the charge transistor (e.g., charge transistor 110) so as to ensure improper charge does not occur. Further, complete enabling of the charge transistor is provided to enable rapid charging of the battery cell(s). Similarly, the battery management system 130 includes supervisory electronics to provide complete enabling and disabling of the discharge transistor (e.g., discharge transistor 112) so as to ensure proper discharge characteristics when coupled to a device. The enabling and disabling of charge and discharge transistors are discussed in greater detail below.

Monitoring electronics that are part of battery management system 130 can be used to estimate remaining battery capacity. Battery capacity information can be communicated between the battery management system 130 and a connected device/charger through a communications port terminal 160. As will be discussed in greater detail below, a microcontroller (and associated memory) can be included within battery management system 130 and can provide system control and communication with a connected device.

Battery Management System

Figure 2:
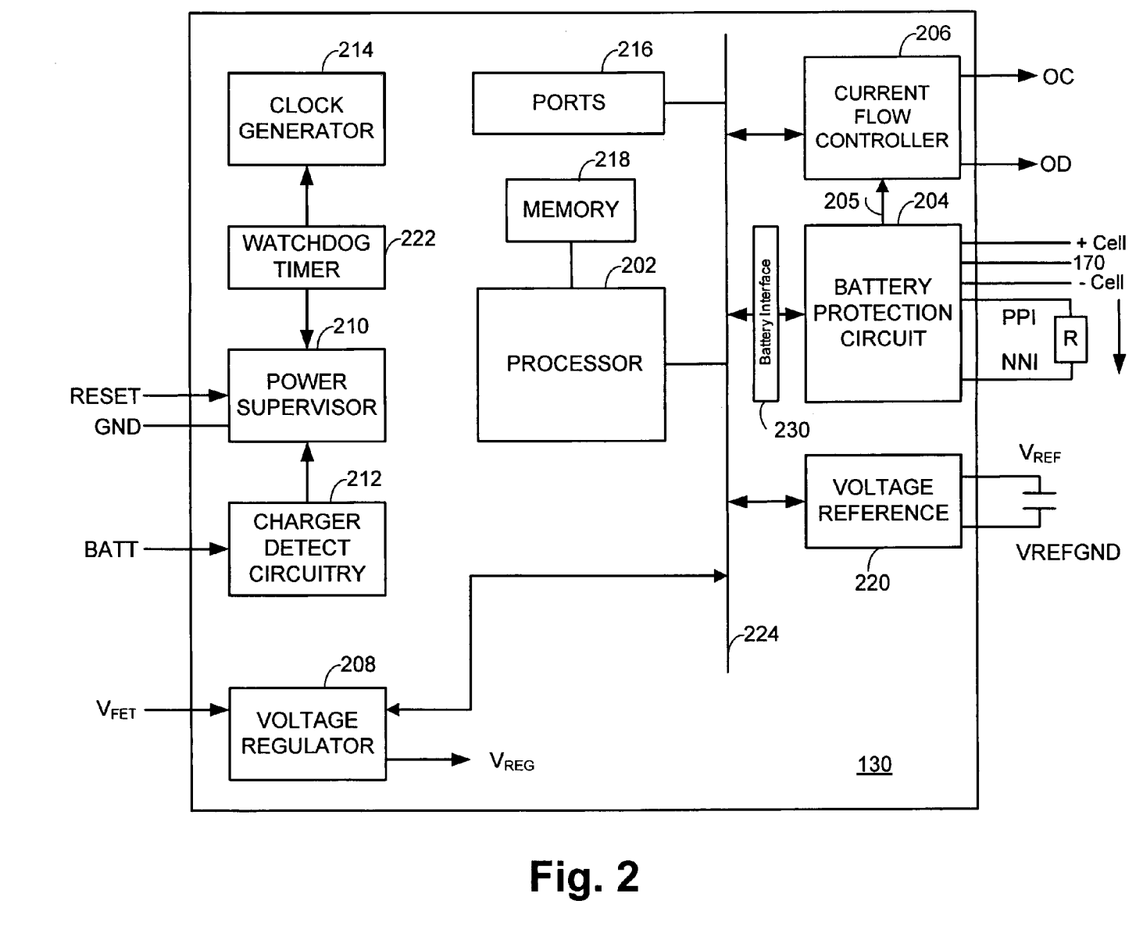
FIG. 2 is a block diagram of a battery management system.

FIG. 2 shows a block diagram of an exemplary battery management system 130 used in the battery pack 100. The battery management system 130 generally includes a processor 202 (e.g., a low-power, CMOS 8-bit microcontroller based on a RISC architecture), a battery protection circuit 204, a current flow controller 206, voltage regulator 208, power supervisor 210, charge detector 212, clock generator 214, ports 216, memory 218, voltage reference 220, and watchdog timer 222. The processor 202, ports 216, battery protection circuit 204, and voltage reference 220 are each coupled to a data bus 224.

A practical implementation of the battery management system 130 can include other components and subsystems, which have been removed from FIG. 2 for clarity purposes.

For example, the battery management system 130 can include circuitry for battery monitoring (e.g., analog-to-digital converters), cell balancing circuitry (e.g., cell balancing FETs) for balancing cell voltages, a communications device for communicating with an external device, noise suppression circuitry, wake-up timer, and other monitor or control circuitry.

The memory 218 can be programmed with instructions that can be executed by the processor 202 to perform various tasks, such as cell balancing, battery protection, and current measurements for determining charge level.

In some implementations, the current flow controller 206 has several outputs (e.g., OC, OD) which are coupled to external devices that can be configured by the current flow controller 206 to control the current flow between the battery cells and a device or charger. The current flow controller 206 includes various circuits and logic (e.g., operational amplifiers, control and status registers, transistors, capacitors, diodes, inverters, gates, etc.) for generating voltages at the outputs (e.g., OC and OD). In some implementations, the OC output is a high voltage output that is coupled to the gate of a charge FET (e.g., charge transistor 110) to completely or partially enable or disable the charge FET to control current flow during a charging event. The OD output is a high voltage output that is coupled to the gate of a discharge FET (e.g., discharge transistor 112) to completely or partially enable or disable the discharge FET to control current flow during a discharging event. FIG. 1B shows an exemplary configuration of FET devices in a high-side implementation for controlling current flow in response to control voltages from the current flow controller 206.

The current flow controller 206 is coupled to the battery protection circuit 204 through interface 240. The battery protection circuitry 204 includes circuitry (e.g., a differential amplifier) for monitoring the battery cell voltage and charge/discharge currents to detect fault conditions, and to initiate actions (e.g., disabling or partially disabling charge and discharge FETs) to protect the battery pack 100 from being damaged. Examples of fault conditions include but are not limited to: deep under-voltage during discharging, short-circuit during discharging and-over-current during charging and discharging. In some implementations, a current sense resistor ($R_{sense}$, i.e., shunt resistor 114) can be coupled across the PPI and NNI inputs of the battery protection circuit 204, where PPI is an unfiltered positive input from the current sense resistor and the NNI is an unfiltered negative input from the current sense resistor. The current sense resistor can be coupled to the battery cells and battery management system 130, as described with respect to FIG. 1B.

Gate Driver

Figure 3:
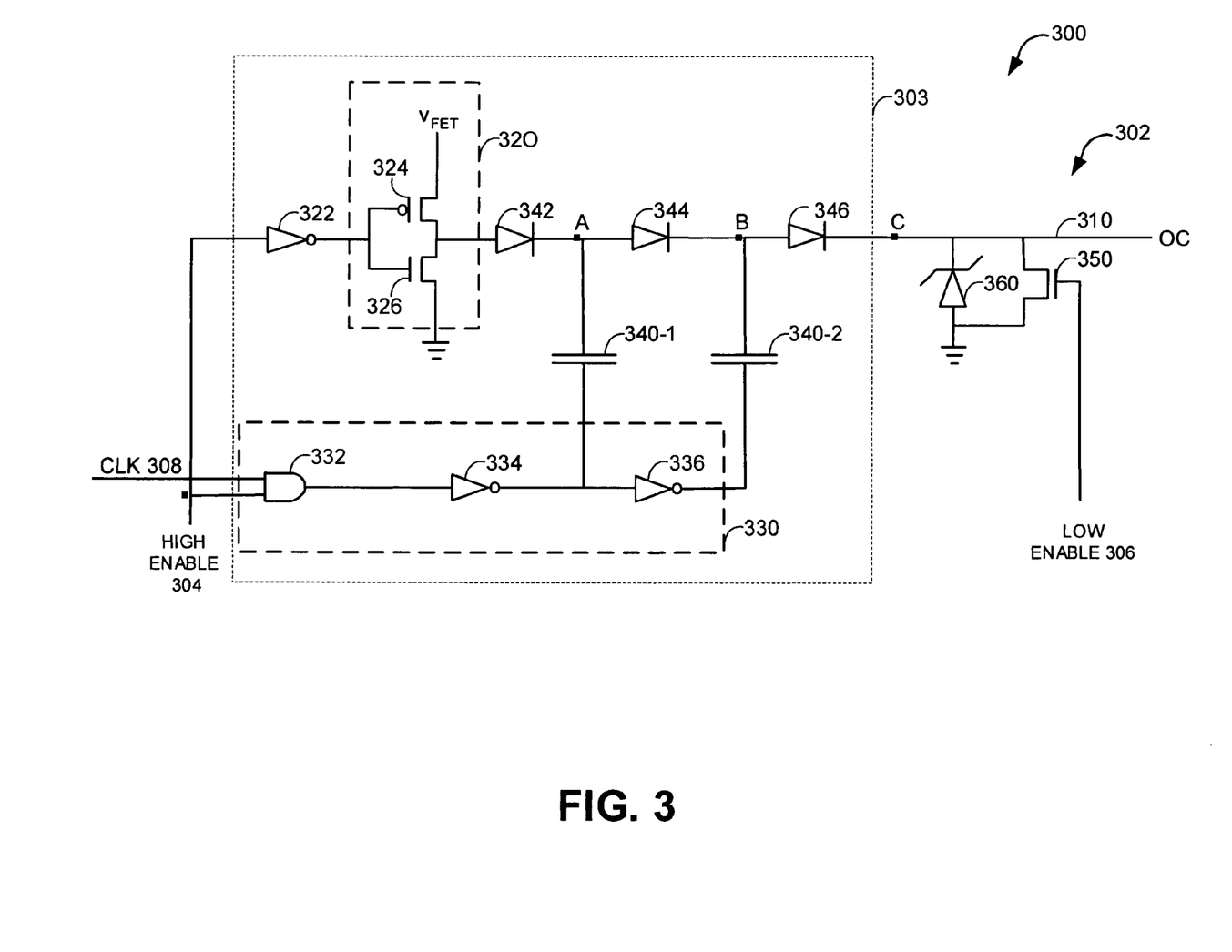
FIG. 3 is a block diagram of a drive circuit for driving a charge transistor.

Referring now to FIG. 3, a drive circuit 300 associated with the charge transistor (OC FET) in the high-voltage front end of the battery pack 100 is shown. Drive circuit 300 forms part of the current flow controller 206 of FIG. 2 and includes gate driver 302. Gate driver 302 is operable to provide a drive signal to the input gate of the charge transistor (i.e., charge transistor 110). Another instance of the gate driver 302 is operable to provide a drive signal to the input gate of the discharge transistor (i.e., transistor 112). In one implementation, the drive signal provided by the gate driver 302 is characterized as being disabled representing a low-state at a level that is substantially at the ground level of the battery management system 130. In one implementation, the drive signal provided by the gate driver 302 is characterized as being enabled representing a high-state at a level that is substantially at the battery management system operating supply plus a constant (the "boost"). In one implementation, the constant is a potential that is sized to ensure complete enabling of the charge transistor. By providing the additional boost, gate driver 302 can be ensured of completely enabling the charge transistor and allowing for rapid charging of the battery cell (s).

Gate driver 302 includes inputs including high and low enable signals 304, 306 respectively, and a clock signal 308. Instances of gate driver 302 provide an output signal 310 that drives the charge FET (OC FET, i.e., charge transistor 110) and the discharge transistor (i.e., transistor 112). Gate driver 302 includes a charge pump 303 and disable switch 350. Charge pump 303 is operable to provide a drive signal (enable signal) to the charge transistor 110. The charge pump 303 is controlled by clock signal 308 and high enable signal 304. The control of the charge pump 303 is described in greater detail below. The disable switch 350 is operable to provide a second type of drive signal (the disable signal) to the charge transistor 110. The disable switch 350 is controlled by the low enable signal 306 and will be described in greater detail below.

Charge Pump

In one implementation, charge pump 303 includes a drive signal source 320, boost logic 330, signal boosters 340-1 and 340-2 and a plurality of blocking diodes 342, 344, 346.

Drive signal source 320 provides an initial level drive signal which is pumped up by the operation of charge pump 303. In the implementation shown, drive signal source 320 is of the form of a level shifter that includes complementary transistors 324, 326. As shown, complementary transistors 324 and 326 have gates that are complementarily, that is, only one is enabled at a given time. The gate inputs to complementary transistors 324, 326 are provided by an inverter 322. The input to inverter 322 is provided by high enable signal 304. Accordingly, as the high enable signal 304 is driven high, the input to inverter 322 is driven high. Thereafter, the output of inverter 322 is driven low and is presented to the gate inputs of complementary transistors 324, 326. The high-side transistor 324, with its low input enable, is enabled by the low signal presented by inverter 322 resulting in the battery management system supply potential (i.e., $V_{fet}$) being presented to the output of the drive signal source 320. Alternatively, if the high enable signal 304 is driven low (i.e., the input to inverter 322 is low), the output of inverter 322 is driven high and is presented to the gate inputs of complementary transistors 324, 326. In this condition, the low-side transistor 326, with its high input enable, is enabled by the high signal presented by inverter 322 resulting in the battery management system ground potential (i.e., GND) being presented to the output of the drive signal source 320. In this way, the drive signal source 320 is configured to provide either substantially a ground or substantially an operating potential signal to the remainder of the charge pump circuitry in accordance with the high enable signal 304 as will be discussed in greater detail below.

The output of drive signal source 320 is provided to an input of blocking diode 342. Blocking diode 342 allows the output signal of the drive signal source 320 to be promulgated toward the output of charge pump 303, while blocking any return signal. The output of blocking diode 342 is coupled to the input of a second blocking diode 344 as will be discussed in greater detail below.

Boost logic 330 is provided to selectively control the addition of a boost signal to the drive signal provided by the drive signal source 320. In the implementation shown boost logic 330 includes AND gate 332, and inverters 334, 336. One input to AND gate 332 is the high enable signal 304. A second input to AND gate 332 is a clock signal 308. In one implementation clock signal 308 is a fast clock signal that allows the charge pump to quickly achieve the correct potential level (e.g., a 3.6 MHz). Alternatively, a slow clock signal that consumes less power can be used (e.g., 131 kHz). In one implementation, charge pump 303 is provided with one of a fast or slow clock signal at the clock signal input 308 depending on a mode of operation of the battery management system 130. For example, if the battery management system 130 is in a low power or sleep mode, the slow clock signal can be provided to the charge pump 303. Alternatively, if the battery management system 130 is not in a low power mode, a fast clock signal can be provided to the clock signal input 308. In another implementation, a fast clock signal can be provided for a predetermined period of time (i.e., initially) to the charge pump 303 even when in the low power mode. Doing so ensures that the FET driver (i.e., gate driver 302) reaches the correct charge levels quickly even in low power modes.

The output of AND gate 332 is provided to the input of inverter 334. The output of inverter 334 is provided to the input of inverter 336 and to the input of signal booster 340-1. The output of inverter 336 is provided to the input of signal booster 340-2. In one implementation, each of the boost logic gates is powered by a regulated voltage that is provided by the battery management system 130. The regulated voltage ($V_{REG}$) is provided by a voltage regulator 208 (either step up, linear regulator or both) of the battery management system 130.

Signal boosters 340 can be of the form of capacitive elements. In one implementation, each signal booster 340 is a capacitor sized substantially to be 10 picofarads. The output of signal booster 340-1 is coupled to the input of second blocking diode 344. The output of the second blocking diode 344 is coupled to the input of a third blocking diode 346. First blocking diode 342 prevents the output of the first signal booster 340-1 from being returned into the drive signal source 320. The output of signal booster 340-2 is coupled to the input of the third blocking diode 346. Second blocking diode 344 prevents the output of signal booster 340-2 from being returned into the drive signal source 320 (or for that matter into signal booster 340-1). Third blocking diode 346 allow for boosting the output signal when the signal booster 340-2 is driven high and to prevent the resulting high signal level on the capacitive load from being returned to the signal booster 340-2 when the signal booster 340-2 is driven low. The output of third blocking diode 346 is coupled to the output of the gate driver 302 producing output signal 310. Typically, the output signal 310 is coupled to a large capacitive load. The operation of charge pump 303 and the various components thereof will be discussed in greater detail below.

In one implementation, charge pump 303 includes a clamp 360. Clamp 360 protects internal circuitry of the battery management system 130 and can provide a clamp to ensure that charging can be disabled in the presence of a high charger voltage. In the implementation shown, clamp 360 is of the form of a zener diode coupled between the output of charge pump 303 and battery management system ground (GND) that is sized and rated appropriately to ensure the enabled drive signal provided by the charge pump is sufficient to enable the input gate of the charge transistor.

Disable Switch

Disable switch 350 is also coupled to the output of the gate driver for producing a disabled output signal 310. Disable switch 350 is enabled by low enable signal 306. In the implementation shown, disable switch is of the form of a transistor that is coupled between the output of the charge pump 303 and battery management system ground (GND). The low enable signal 306 is provided as an input to the gate of the transistor for controlling the enabling and disabling of the disable switch 350. When enabled (i.e., low enable signal 306 is set), disable switch 350 provides a direct signal path to chip ground, accordingly providing a ground signal to the gate of the charge transistor (e.g., completely disabling the gate of an NFET charge transistor). High enable signal 304 and low enable signal 306 are complementary, and accordingly only one is enabled at any given time. Depending on which is enabled, one of the disable switch 350 or charge pump 303 provides the output signal 310 thereby controlling the enabling and disabling of the charge transistor.

Operation

Gate driver 302 operates in one of at least two modes: high (enabled) or low (disabled). In high (enabled) mode, charge pump 303 provides an output signal 310 that is at a level equal to substantially the battery management system supply plus a constant. In one implementation, the constant is equal to two (2) times a regulated voltage input less diode drops ($Voc = V_{FET} + 2V_{REG}$–diodes).

In the implementation shown in FIG. 3, the constant is generated as follows. When the gate driver 302 is enabled, the high enable signal 304 is set as discussed above. The clock signal 308 provided to the input to AND gate 332 toggles between high and low at the clock frequency. Initially, when the gate driver is enabled, and no clock signal is present, the following observations can be made: point A on FIG. 3 is at a potential of substantially $V_{fet}$ minus a diode drop, point B is at a potential of substantially $V_{fet}$ minus two diode drops and point C is at a potential of $V_{fet}$ minus three diode drops. When the clock signal 308 transitions high (the high enable signal 304 is assumed to be set), the output of AND gate 332 is high. The high output of AND gate 332 is provided to inverter 334 whose output goes low. The low output of inverter 334 is coupled to inverter 336 whose output is high. The high output of inverter 336 provides a potential ($V_{REG}$) to the input of signal booster 340-2 (e.g., the lower plate of the capacitive element 340-2 sees $V_{REG}$). Responsive to the input potential provided by inverter 336, the output of the signal booster 340-2 (e.g., the opposite plate of the capacitive element 340-2) is raised by the $V_{REG}$ potential. In the implementation shown, the capacitive element is charged by an amount equal to the potential provided by the inverter 336, producing a pumped up signal at node B (on the output of the charge pump 303). More specifically, when the clock signal goes high the following observations can be made: point A on FIG. 3 initially drops (because of the low produced by the output of inverter 334) but then rises back to the level of $V_{fet}$ minus a diode drop from the output of the drive signal source 320; point B is at a potential of substantially $V_{fet}$ plus $V_{REG}$; and point C is a at a potential Of $V_{fet}$ plus $V_{REG}$ minus a diode drop. When the clock signal changes state and falls again, thereby disabling the inverter 336, a similar boosting occurs.

More specifically, when the clock signal 308 is low (the high enable signal 304 is again assumed to be set), the output of AND gate 332 is low. The low output of AND gate 332 is provided to inverter 334 whose output goes high. The high output of inverter 334 provides a potential ($V_{REG}$) to the input to signal booster 340-1 (e.g., the lower plate of the capacitive element 340 sees $V_{REG}$). Responsive to the input potential provided by inverter 334, the output of the signal booster 340-1 (e.g., the opposite plate of the capacitive element 340-1) is raised by the $V_{REG}$ potential. In the implementation shown, the capacitive element is charged by an amount equal to the potential provided by the inverter 334, producing a pumped up signal at node A (on the output of the charge pump 303). More specifically, when the clock signal falls the following observations can be made: point A on FIG. 3 rises to $V_{fet}$ minus a diode drop plus $V_{REG}$ (because of the high signal level produced by the output of inverter 334); point B is at a potential of substantially $V_{fet}$ plus two times $V_{REG}$ minus a diode; and point C is at a potential of $V_{fet}$ plus two times $V_{REG}$ minus two diode drops.

Accordingly, by providing the oscillation of the clock signal from high to low, signal boosters 340-1 and 340-2 are alternatively enabled (e.g., charged) so as to pump up the output signal 310 provided by charge pump 303. At node A, the signal level when enabled (i.e., when the high enable signal 304 is set) is substantially equal to the battery management system supply (i.e., $V_{FET}$) plus $V_{REG}$ (the boost from signal booster 340-1) less one diode (e.g., blocking diode 342). At node B, the signal level when enabled is substantially equal to the battery management system supply (i.e., $V_{FET}$) plus two times $V_{REG}$ (one boost from signal booster 340-1 and one boost from signal booster 340-2) less two diodes (blocking diodes 342 and 344). At the output to the charge pump 303 (node C), the signal level when enabled is substantially equal to the battery management system supply (i.e., $V_{FET}$) Plus two times $V_{REG}$ less three diodes (blocking diodes 342, 344, 346). As discussed above, in some implementation, the output signal 310 provided at node C can be clamped, by for example, clamp 360.

While FIG. 3 shows one implementation for a gate driver 302, other configurations are possible. For example, more that two signal boosters 340 can be included in the gate driver 302. In one implementation, a plurality of signal boosters (340-1, . . . , and 340-n), associated blocking diodes and inverter logic are used to produce a boosted enable signal that is at a predetermined level (e.g., producing an output signal equal to substantially $V_{fet}$ plus $n*V_{REG}$ minus n diode drops).

In some implementations, other circuitry can be associated with the gate driver 302. For example, control circuitry can be provided to partially enable the gate of the charge transistor, such as might be required to manage recovery from a deep under voltage condition of the batteries. For the purposes of clarity, these other circuit elements have been left out of the drive circuit 300 shown. Further, the details showing the enabling and disabling of high and low enable signals 304 and 306 have been omitted. Supervisory circuitry that forms part of battery management system 130 can provide one or both of high and low enable signals 304, 306. For example, battery management system 130 can include a separate input that is used to detect the connection of an appropriate or unusual charger. If an unusual (i.e., harmful) charger is detected, the low enable signal 306 can be set. The setting of the high and low enable signals 304, 306 can be by or be under the supervision of the microcontroller (i.e., processor 202), battery protection module 204, or other elements in the battery management system 130.

FIG. 3 shows a configuration for a gate driver for a charge transistor associated with the battery pack. A similar gate driver can be included for the discharge transistor. That is, in one implementation, a separate gate driver is provided for the discharge transistor of the battery pack so as to allow the individual and complete control of the respective charge and discharge transistors. Those of ordinary skill in the art will recognize that all of the variations discussed above with respect to the gate driver associated with the charge transistor (e.g. gate driver 302) are applicable to the gate driver provided for the discharge transistor including the boosting of the enable signal for completely enabling the discharge transistor.

While reference has been made to boosting an enable signal (i.e., boosting the signal level applied in order to fully enable one of either a charge or discharge transistor), the teachings above can be applied to boosting the signal levels of a disable signal where appropriate (e.g., when using PFETs and using a gate driver with boost so as to disable the PFETs).

Gate Driver Method

Figure 4:
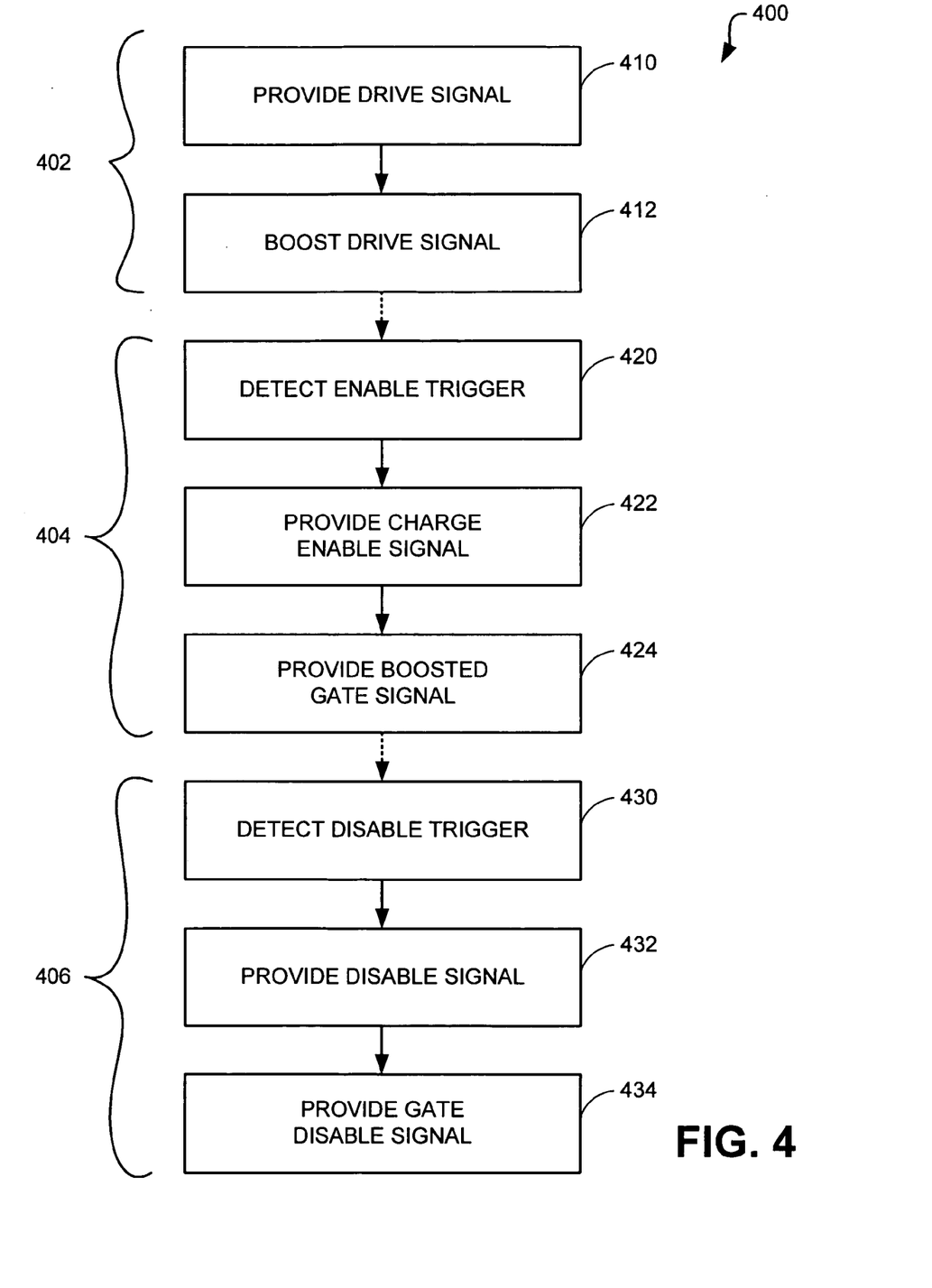
FIG. 4 is a flow diagram for a boosted drive method.
Like reference symbols in the various drawings indicate like elements.

Referring now to FIG. 4, a flow diagram for a method 400 for driving a gate of one of either a charge or discharge transistor is provided. Drive method 400 includes three distinct parts, a boost phase 402, an enable stage 404 and a disable stage 406.

The boost phase 402 can occur prior to or coincident with the enable stage. That is, the boosting of the drive signal can occur prior to the enablement, or coincident with the enabling of a charge/discharge transistor. The boost phase includes providing a drive signal (410) that may vary (e.g., the drive signal is the battery management system supply $V_{fet}$ which can vary with the potential of the battery cell(s) or in the presence of a charger) and boosting the drive signal (412).

The enable phase 404 includes detecting of an enable trigger (420). The enable trigger can include the detection of an appropriate charger. In addition, the enable trigger can include the detection of an appropriate condition signal that indicates that the cell(s) can be safely charged. After the enable trigger is detected, a charge enable signal can be provided (422) and boosted drive enable signal can be provided (424) to a charge transistor to enable rapid and complete charging.

The disable phase 406 includes the detecting of a disable trigger (430). The disable trigger can include the detection of an appropriate condition signal that indicates that the cell(s) cannot be safely charged. Alternatively, the disable trigger can include the detection of an appropriate condition signal that indicates any unsafe condition. In one implementation, both charge and discharge transistors are disabled upon detection of a potentially dangerous condition, such as short circuit. Alternatively, the disable trigger can be a default setting that is maintained in the absence of an enable trigger. After the disable trigger is detected, a charge disable signal can be provided (432) and a disable signal can be provided (434) to a charge transistor to completely disable charging. A corollary method can be used for enabling and disabling the discharge transistor (i.e., similar in terms of the boost to provide adequate drive enable, but corollary in that the discharge transistor is enabled and disabled with distinctly different triggers). As discussed above, the boosting of the disable signal is possible where required to ensure complete disabling of the charge or discharge transistors.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
   determining that a charger is coupled to a battery system, the battery system including one or more cells coupled to a high-side NFET charge enable transistor, the battery system further including a drive circuit coupled to the high-side NFET charge enable transistor; and enabling the charge enable transistor, including driving using the drive circuit a gate terminal of the high-side NFET charge enable transistor at a potential that is greater than a potential of the one or more cells.

2. The method of claim 1 where driving includes boosting a drive signal provided at a level of the potential of the one or more cells.

3. The method of claim 2 further comprising pumping up the drive signal to a boosted signal level to drive the gate terminal of the high-side NFET charge enable transistor.

4. The method of claim 3 where pumping up the drive signal includes capacitively coupling a boost signal to the drive signal at the potential of the cells.

5. The method of claim 2 where boosting the drive signal includes boosting the drive signal to a level that is substantially equal to the potential of the cells plus a constant.

6. The method of claim 5 where the constant is substantially equal to two times a regulated voltage, the regulated voltage being sourced by the cells.

7. The method of claim 6 where the constant is substantially equal to two times the regulated voltage less voltage drops associated with blocking diodes.

8. The method of claim 5 where the constant is greater than about two times a regulated voltage.

9. The method of claim 5 where the constant is greater than about two times a regulated voltage less voltage drops associated with blocking diodes.

10. The method of claim 1 where driving includes boosting a drive signal with a booster circuit.

11. The method of claim 1 where:
the drive circuit includes a charge pump and the charge pump includes a boost logic circuit, a drive signal source, one or more signal boosters, and a clamp;
the boost logic circuit is operable to selectively control an addition of a boost signal to the drive signal;
the drive signal source includes a level shifter that includes one or more complementary transistors;
the drive signal source is operable to provide an initial level drive signal which is pumped up by the charge pump, where the initial level drive signal is provided at a level of the potential of the one or more cells;
the one or more signal boosters comprise one or more capacitive elements; and
the clamp comprises a zener diode coupled between an output of the charge pump and a ground node of the battery system.

12. A method comprising:
enabling determining if a device is coupled to a battery system, the battery system including one or more cells coupled to a high-side NFET discharge enable transistor, the battery system further including a drive circuit coupled to the high-side NFET discharge enable transistor; and
enabling the discharge enable transistor including driving using the drive circuit a gate terminal of the high-side NFET discharge enable transistor to a potential that is greater than a potential of the one or more cells to allow for discharging by the device.

13. A method for charging and discharging a battery system comprising:
detecting if a first enable trigger for charging one or more cells of a battery system is present;
if the first enable trigger is present, enabling a high-side NFET charge enable transistor associated with the battery system to an enabled state including driving a first gate terminal of the high-side NFET charge enable transistor to a first potential that is greater than a third potential of the one or more cells;
detecting if a second enable trigger for discharging the one or more cells of the battery system is present; and
if the second enable trigger is present, enabling a high-side NFET discharge enable transistor associated with the battery system to an enabled state including driving a second gate terminal of the high-side NFET discharge enable transistor to a second potential that is greater than a fourth potential of the one or more cells.

14. An apparatus comprising:
a high-side NFET charge enable transistor operable to enable charging of one or more cells of a battery pack; and
a drive circuit coupled to the high-side NFET charge enable transistor and operable to drive a gate terminal of the charge enable transistor, the drive circuit including:
a drive signal source providing a drive signal to drive a gate terminal of the high-side NFET charge enable transistor; and
a signal booster coupled to the drive signal source and operable for driving the drive signal to a boosted level that is greater than a potential of the one or more cells of the battery pack.

15. The apparatus of claim 14 where:
the drive circuit includes a charge pump and the charge pump includes a boost logic circuit, the drive signal source, the signal booster, and a clamp;
the boost logic circuit is operable to selectively control an addition of a boost signal to the drive signal;
the drive signal source includes a level shifter that includes one or more complementary transistors;
the drive signal source is operable to provide an initial level drive signal which is pumped up by the charge pump, where the initial level drive signal is provided at the potential of the one or more cells of the battery pack;
the signal booster comprises at least one capacitive element; and
the clamp comprises a zener diode coupled between an output of the charge pump and a ground node of the battery pack.

* * * * *

UNITED STATES PATENT AND TRADEMARK OFFICE
CERTIFICATE OF CORRECTION

| | | |
|---|---|---|
| PATENT NO. | : 7,595,608 B2 | |
| APPLICATION NO. | : 11/373821 | |
| DATED | : September 29, 2009 | |
| INVENTOR(S) | : Gunnar Gangstoe and Arne Aas | |

It is certified that error appears in the above-identified patent and that said Letters Patent is hereby corrected as shown below:

Column 1, Line 9; replace:
"Many modem portable devices (e.g., laptop computers," with
-- Many modern portable devices (e.g., laptop computers, --

Column 1, Line 49; replace:
"battery-pack terminal (e.g., the external negative terminal" with
-- battery pack terminal (e.g., the external negative terminal --

Column 2, Line 22; replace:
"can include integrating using a high-voltage CMOS process;" with
-- can include integrating using a high-voltage CMOS process. --

Column 7, Line 41; replace:
"cuit during discharging and-over-current during charging and" with
-- cuit during discharging and over-current during charging and --

Column 10, Line 57; replace:
"point C is a at a potential Of $V_{fet}$ plus $V_{REG}$ minus a diode" with
-- point C is a at a potential of $V_{fet}$ plus $V_{REG}$ minus a diode --

Column 11, Line 27; replace:
"to the battery management system supply (i.e., $V_{FET}$) Plus" with
-- to the battery management system supply (i.e., $V_{FET}$) plus --

Signed and Sealed this

Ninth Day of February, 2010

David J. Kappos
*Director of the United States Patent and Trademark Office*